US010804763B2

(12) United States Patent
Saito et al.

(10) Patent No.: US 10,804,763 B2
(45) Date of Patent: Oct. 13, 2020

(54) CORELESS COIL AND METHOD FOR MANUFACTURING CORELESS COIL

(71) Applicant: NIDEC COPAL ELECTRONICS CORPORATION, Tokyo (JP)

(72) Inventors: Yusuke Saito, Sano (JP); Kazuhiko Horie, Sano (JP); Masatoshi Obayashi, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/086,652

(22) PCT Filed: May 29, 2017

(86) PCT No.: PCT/JP2017/019821
§ 371 (c)(1),
(2) Date: Sep. 20, 2018

(87) PCT Pub. No.: WO2018/012127
PCT Pub. Date: Jan. 18, 2018

(65) Prior Publication Data
US 2019/0131843 A1 May 2, 2019

(30) Foreign Application Priority Data

Jul. 12, 2016 (JP) .................................. 2016-137208

(51) Int. Cl.
*H02K 3/47* (2006.01)
*H02K 3/26* (2006.01)
(Continued)

(52) U.S. Cl.
CPC .................. *H02K 3/47* (2013.01); *H01F 5/00* (2013.01); *H01F 41/074* (2016.01); *H02K 1/12* (2013.01);
(Continued)

(58) Field of Classification Search
CPC ......... H01F 5/00; H01F 41/074; H02K 15/04; H02K 15/0407; H02K 1/12;
(Continued)

(56) References Cited

U.S. PATENT DOCUMENTS 5,304,884 A * 4/1994 Kitajima .................. H02K 3/04
310/179
2013/0062990 A1* 3/2013 Takeuchi ................. B62M 6/40
310/216.004
2019/0386551 A1* 12/2019 Sasaki ...................... H02K 1/02

FOREIGN PATENT DOCUMENTS

JP 2004-289963 A 10/2004
JP 2007-027345 A 2/2007
(Continued)

*Primary Examiner* — Bernard Rojas
(74) *Attorney, Agent, or Firm* — Norris McLaughlin, P.A.

(57) ABSTRACT

The present invention is a coreless coil characterized in that a plurality of α-winding coils are formed by a first coil layer and a second coil layer that has a same shape and a same width as the first coil, each coil layer having a center opening, being laminated together. Each outer peripheral portion in a connection direction of the plurality of α-winding coils has a connection stepped portion that is point-symmetric in relation to a center axis line of a Z-axis (the Z-axis being an axis that, in relation to an X-axis that is a center of both connected end portions of the α-winding coil and passes through a lamination boundary line of the first coil layer and the second coil layer, is a center of both unconnected end portions of the α-winding coil and passes through the lamination boundary surface such as to be orthogonal to the X-axis) of the respective center opening. The plurality of α-winding coils are connected in an annular shape in a state in which the connection stepped portions overlap each other and are attached to each other. An object of the present invention is to improve the bonding force of the plurality of α-winding coils.

4 Claims, 8 Drawing Sheets

(51) Int. Cl.
   *H02K 15/04*     (2006.01)
   *H02K 1/12*      (2006.01)
   *H02K 3/28*      (2006.01)
   *H01F 5/00*      (2006.01)
   *H01F 41/074*    (2016.01)
   *H02K 15/12*     (2006.01)

(52) U.S. Cl.
   CPC ............... *H02K 3/26* (2013.01); *H02K 3/28* (2013.01); *H02K 15/04* (2013.01); *H02K 15/045* (2013.01); *H02K 15/0407* (2013.01); *H02K 15/12* (2013.01); *H02K 2203/03* (2013.01)

(58) Field of Classification Search
   CPC ........ H02K 2203/03; H02K 3/26; H02K 3/28; H02K 3/47; H02K 15/045; H02K 15/12
   USPC ................................. 310/52, 54, 57, 58, 64
   See application file for complete search history.

(56) References Cited

FOREIGN PATENT DOCUMENTS

| | | | |
|---|---|---|---|
| JP | 2009-071939 A | 4/2009 |
| JP | 5393097 B2 | 1/2014 |

\* cited by examiner

CORELESS COIL AND METHOD FOR MANUFACTURING CORELESS COIL

BACKGROUND OF THE INVENTION

1. Field of the Invention

The present invention relates to a coreless coil that is used in compact electric motors and power generators.

2. Description of the Related Art

FIG. 7 in Patent Literature 1 describes an example of "an annular α-winding coil that has a curved surface." The α-winding coil is described as being configured by a conductive wire, an insulating coating that covers around the conductive wire, and a fused coating that further covers around the insulating coating.

FIG. 4 and FIG. 5 in Patent Literature 2 describe "an annular α-winding coil." For example, with reference to a cross-sectional view in FIG. 5, the annular α-winding coil is configured by a first coil layer that is positioned on an upper side and a second coil layer that has the same shape and the same width as the first coil layer being laminated together. It can be seen that both the upper and lower coil layers are positionally shifted from each other in the left/right direction "to improve withstand voltage." However, joining single units of the annular α-winding coil into an annular shape is neither described nor suggested.

[Patent Literature 1] Japanese Patent Laid-open Publication No. 2007-27345
[Patent Literature 2] Japanese Patent Publication No.

SUMMARY OF THE INVENTION

The main object of the present invention is to improve the bonding force of a plurality of α-winding coils. In particular, the main object is that self-fusion that occurs as a result of pressure and heat when the α-winding coils, each of which has a pair of protruding end portions and is composed of two layers of thin coils that substantially have the same shape and the same width, are bonded together can be sufficiently utilized. A second object of the present invention is that connected sections do not easily separate even when the two-layer thin coils are partially connected into an annular shape, and excellent strength is achieved as a whole. A third object of the present invention is that excellent shape retention can be achieved. A fourth object of the present invention is that soldering of the protruding end portions of the coils onto a printed board is facilitated.

A coreless coil of the present invention is characterized in that a plurality of α-winding coils are formed by a first coil layer and a second coil layer that has a same shape and a same width as the first coil, each coil layer having a center opening, being laminated together. Each outer peripheral portion in a connection direction of the plurality of α-winding coils has a connection stepped portion that is point-symmetric in relation to a center axis line of a Z-axis (the Z-axis being an axis that, in relation to an X-axis that is a center of both connected end portions of the α-winding coil and passes through a lamination boundary line of the first coil layer and the second coil layer, is a center of both unconnected end portions of the α-winding coil and passes through the lamination boundary surface such as to be orthogonal to the X-axis) of the respective center opening. The plurality of α-winding coils are connected in an annular shape in a state in which the connection stepped portions overlap each other and are attached to each other. Here, the "coreless coil" refers to a coil in which at least three or more single-unit α-winding coils are continuously connected in an annular shape. In addition, here, the concept of "a state in which . . . are attached to each other" includes adhesion by an adhesive and adhesion (fusion) by a coating being melted.

In addition, a method for manufacturing a coreless coil is characterized in that a center opening (13) of each single-unit α-winding coil (10) that is curved towards one inner surface side is fitted onto each of a plurality of reference support protrusion pieces (21) that are provided in a circumferential direction on an outer peripheral surface of a core body (20) at a predetermined interval. A plurality of single-unit α-winding coils (10) attached to the core body in an annular shape by the reference support protrusion pieces are simultaneously pressed in a radially inward direction by a pressing tool (22) that is arranged in relation to an outer peripheral surface of the core body. The plurality of single-unit α-winding coils (10) are heated by a heating means while the pressing state is maintained. As a result, an annular coreless coil (1) is obtained in a state in which respective connection stepped portions (14, 14) of the plurality of single-unit α-winding coils (10) overlap each other and are attached to each other.

Effects of the Invention (a) According to a first aspect of the invention, the plurality of α-winding coils are connected in an annular shape in a state in which the respective connection stepped portions in the connection direction overlap each other and are attached to each other (such as by an adhesive or self-fusion). Therefore, self-fusion that occurs as a result of, for example, the α-winding coils configured by two layers of thin coils that substantially have the same shape and the same width, being pressed and heated together can be sufficiently utilized. Consequently, the bonding force of the plurality of α-winding coils of which an element wire is a conductive wire can be improved.

(b) According to a second aspect of the invention, the plurality of α-winding coils that are connected in an annular shape has an overall circular cylindrical outer appearance configuration. A cylindrical core is integrally fitted onto or into a peripheral surface of the circular cylindrical shape of the plurality of α-winding. Therefore, shape retention is excellent.

(c) According to a third aspect of the invention, a flange-shaped printed board is provided in one end portion of the short cylindrical core. Each pair of protruding end portions of the plurality of α-windings is soldered to the printed board. Therefore, soldering of the protruding end portions of the coils onto the printed board is facilitated.

(d) According to a fourth aspect of the invention, advantages in that the point-symmetrical connection stepped portions of the single-unit α-winding coils are reliably connected to each other, efficiency of the manufacturing operation is improved, and the like are achieved.

BRIEF DESCRIPTION OF THE DRAWINGS

FIG. 1 is a perspective view of an example of a coreless coil according to the present invention;

FIG. 2 is an explanatory diagram of an α-winding coil (single unit) from a planar view;

FIG. 3 is an explanatory diagram showing an expanded cross-sectional view taken along line 3-3 in FIG. 2;

FIG. 4 is an overall explanatory diagram in which respective connection stepped portions of a plurality of α-winding coils are connected to each other;

FIG. 5 is an explanatory diagram in which the α-winding coil (single unit) is bent into a curved shape towards one side-surface side thereof at the same curvature;

FIG. 6 is an explanatory diagram of an example of a method for manufacturing the coreless coil;

EXPLANATION OF REFERENCE NUMBERS

Figure 1:
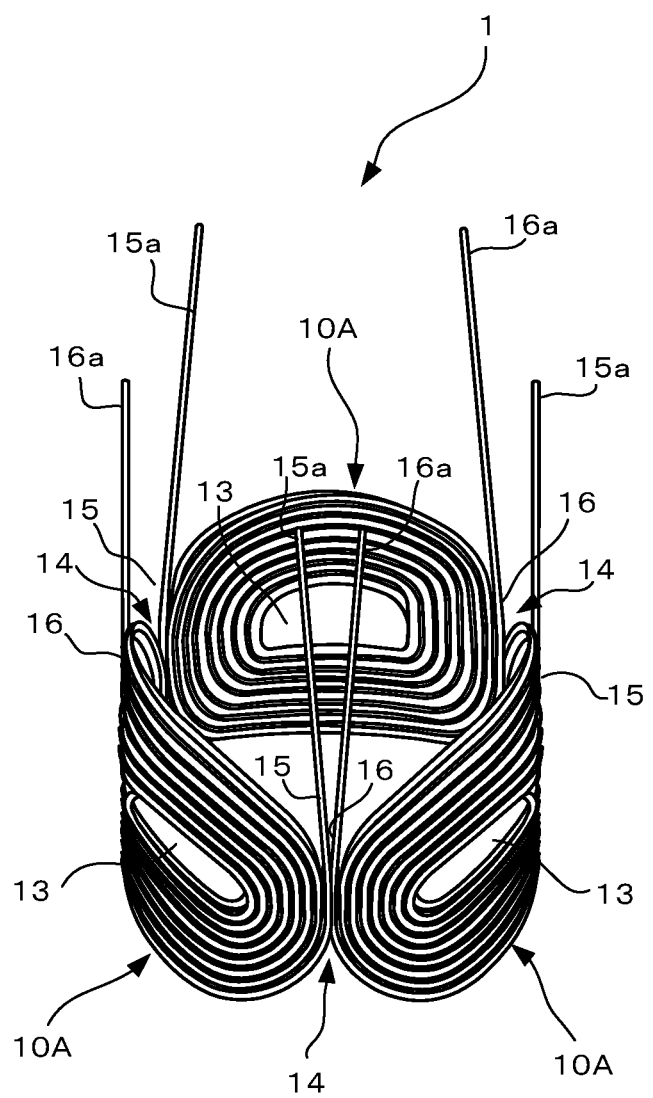
FIG. 1 to FIG. 6 are explanatory diagrams according to a first embodiment of the present invention.

1: coreless coil
10, 10A, 10B: single-unit α-winding coil
11: first coil layer
12: second coil layer
13: center opening
14: connection stepped portion
30: cylindrical core
31: printed board
C: pressing means mounting step
D: pressing and heating step
20: core body
21: reference support protrusion piece
22: pressing tool

DETAILED DESCRIPTION OF THE PREFERRED EMBODIMENTS

FIG. 1 is a perspective view of a coreless coil (a series of air-core α-windings) 1 of the present invention. The coreless coil 1 is formed into an annular shape by a plurality (such as a total of three or six) of flat α-winding coils 10 being continuously self-fused to each other, using a curve forming means, a core body that has a plurality of reference support protrusion pieces in a circumferential direction, a pressing means such as a pressing tool that is arranged in relation to an outer peripheral surface of the core body, and a heating means such as electrical resistance heat, hot air, or infrared irradiation. The α-winding coil (single unit) 10 is configured as shown in FIG. 2 to FIG. 5.

Therefore, although not particularly shown in the drawings, a detailed structure of the α-winding coil 10 is formed into an annular shape by a conductive wire, an insulating coating that covers around the conductive wire, and a fused coating that further covers around the insulating coating being wound around a bobbin-shaped winding body (for example, refer to Patent Literature 1).

Figure 2:
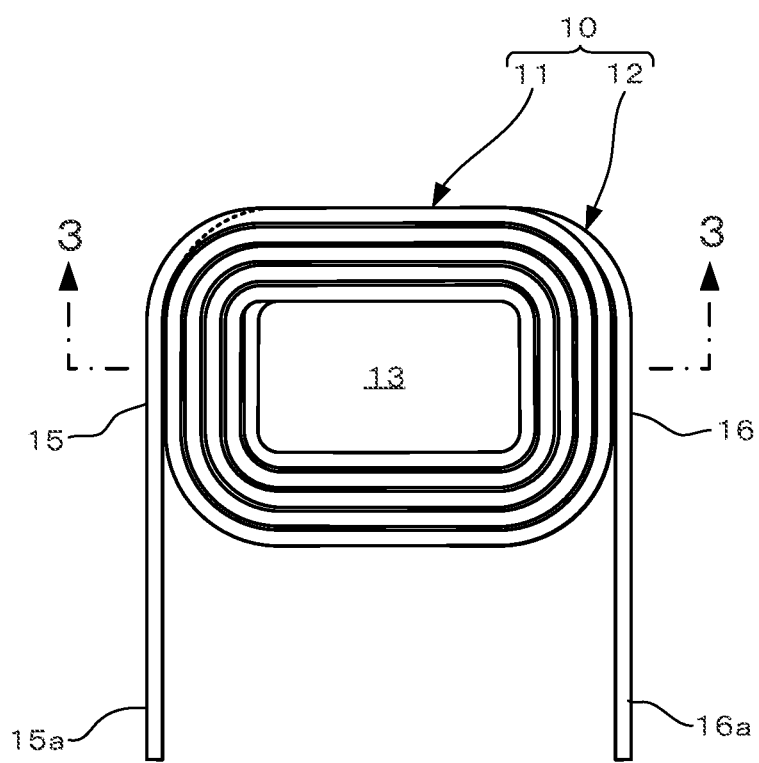

First, a configuration of the α-winding coil 10 will be described with reference to FIG. 2 and FIG. 3. FIG. 2 is an explanatory diagram of the α-winding coil (single unit) 10 from a planar view. Because FIG. 2 is a planar view, reference number 11 denotes an annular first coil layer that is positioned on an upper side. Meanwhile, reference number 12 denotes an annular second coil layer that is positioned on a lower side. As is known, the annular α-winding coil 10 is configured by the first coil layer (the upper coil layer in FIG. 2) 11 and the second coil layer (the lower coil layer in FIG. 2) 12, each of which has a polygonal, rectangular, or track-shaped center opening 13, being laminated together.

The second coil layer 12 has the same shape and the same width as the first coil layer 11.

Figure 3:
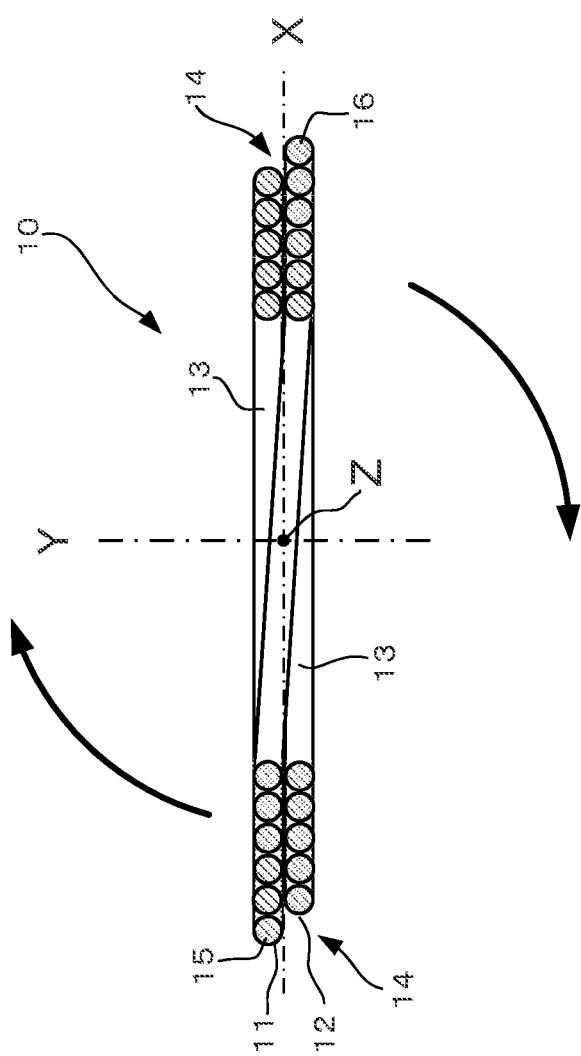

Here, according to the present embodiment, as shown in FIG. 3, although the respective elongated-hole-shaped center openings 13 and 13 of the first coil layer 11 and the second coil layer 12 substantially match, the first coil layer 11 and the second coil layer 12 overlap each other in a state in which respective winding widths are positionally shifted from each other in the left/right direction.

FIG. 3 is an explanatory diagram showing an enlarged cross-sectional view taken along line 3-3 in FIG. 2. As shown in FIG. 3, according to the embodiment, the numbers of windings of the coils are shifted by substantially a single winding in a long-diameter direction. In FIG. 3, for convenience of description, a surface at which a lower surface of the first coil layer 11 and an upper surface of the second coil layer 12 are in close contact is referred to herein as a "lamination boundary surface." An axis line that passes through the lamination boundary surface in a horizontal state is referred to as an "X-axis." Meanwhile, a vertical axis line that passes through the respective centers of the center openings 13 and 13 and is orthogonal to the X-axis is referred to as a "Y-axis." Furthermore, an axis line that passes through the center at which the X-axis and the Y-axis intersect and passes through the lamination boundary surface in a horizontal state such as to be orthogonal to the X-axis is referred to as a "Z-axis."

Therefore, the "Z-axis" herein refers to an axis that, in relation to the X-axis that is the center of both connected end portions of the α-winding coil 10 and passes through the lamination boundary line of the first coil layer 11 and the second coil layer 12, is the center of both unconnected end portions of the α-winding coil 10 and passes through the lamination boundary surface such as to be orthogonal to the X-axis.

Therefore, in the single-unit α-winding coil 10, outer peripheral sections in the connection direction thereof (according to the embodiment, both left and right end portions in the long-diameter direction) form connection stepped portions 14 and 14 that are point-symmetrical (a 180-degree rotational symmetry) in relation to a center axis line of the Z-axis of the center openings 13 and 13 that are formed into elongated holes.

In addition, regarding the left and right connection stepped portions 14 and 14, reference number 15 denotes an outer peripheral portion that is positioned in an outermost part of a winding width of the upper first coil layer 11. A protruding end portion 15a that protrudes from the outer peripheral portion 15 by a required amount serves as one drawn-out lead line. Meanwhile, reference number 16 is an outer peripheral portion that is positioned in an outermost part of a winding width of the lower second coil layer 12. A protruding end portion 16a that protrudes from the outer peripheral portion 16 by a required amount serves as another drawn-out lead line.

Therefore, the protruding end portion 15a on the left side in FIG. 2 is the drawn-out lead line of the upper first coil layer 11. Meanwhile, the protruding end portion 16a on the right side in FIG. 2 is the drawn-out lead line of the lower second coil layer 12.

Furthermore, with reference to FIG. 3, below the outer peripheral portion 15 of the first coil layer 11 on the left side in FIG. 3 is a cavity portion. Meanwhile, above the outer peripheral portion 16 of the second coil layer 12 on the right side in FIG. 3 is a cavity portion that is point-symmetrical in relation to the center axis line of the Z-axis as described above.

Figure 4:
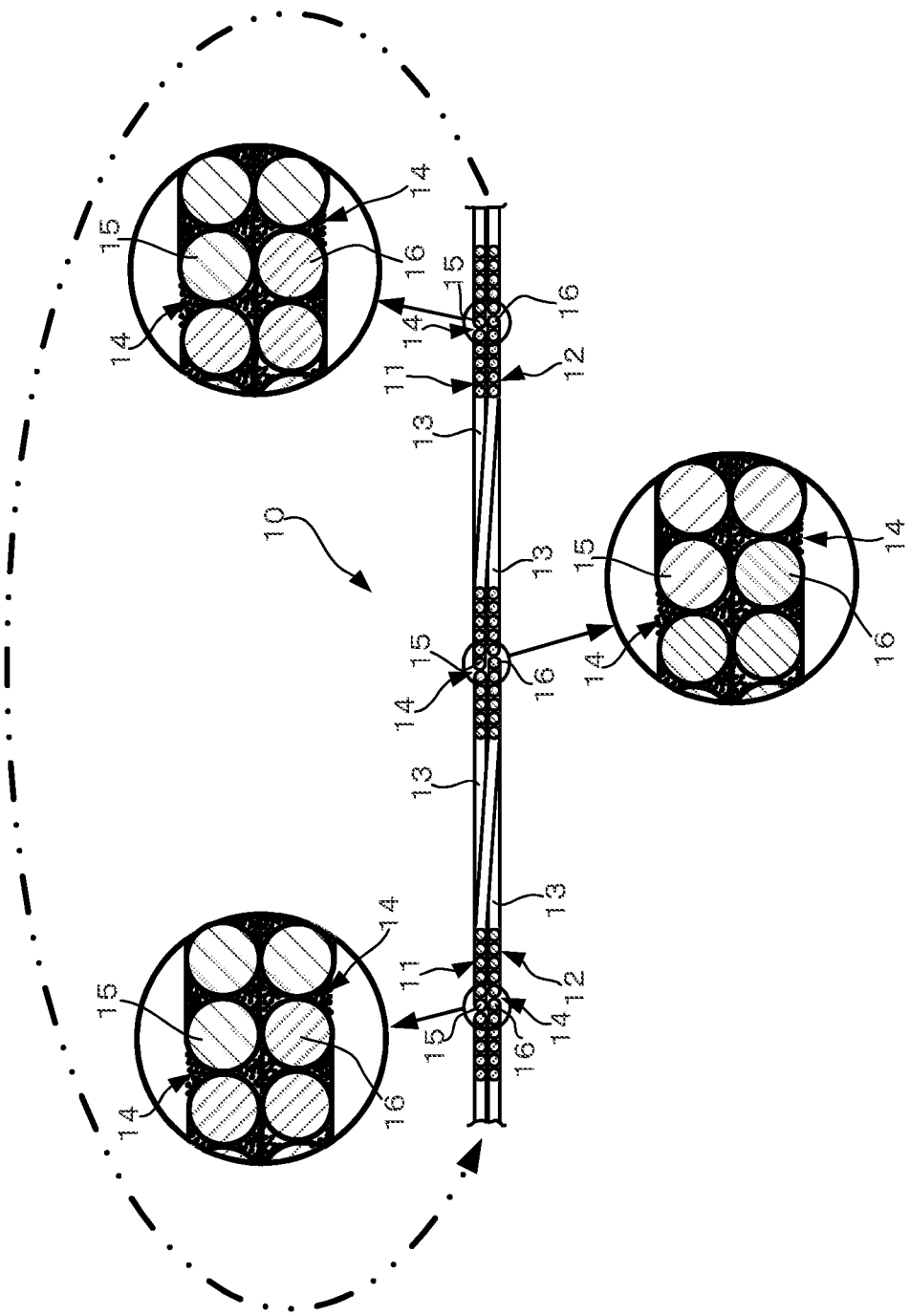

FIG. 4 is an overall explanatory diagram in which respective connection stepped portions 14 of a plurality of α-winding coils 10 are connected to each other. In the present invention, the respective outer peripheral portions 15 and 16 in the connection direction of the plurality of α-winding coils 10 are the connection stepped portions 14 and 14 that are point-symmetrical in relation to the center axis line of the Z-axis of the center openings 13 and 13. Therefore, the plurality of α-winding coils 10 are configured to be connected in an annular shape such that the connection stepped portions 14 and 14 overlap each other and by self-fusion.

Figure 5:
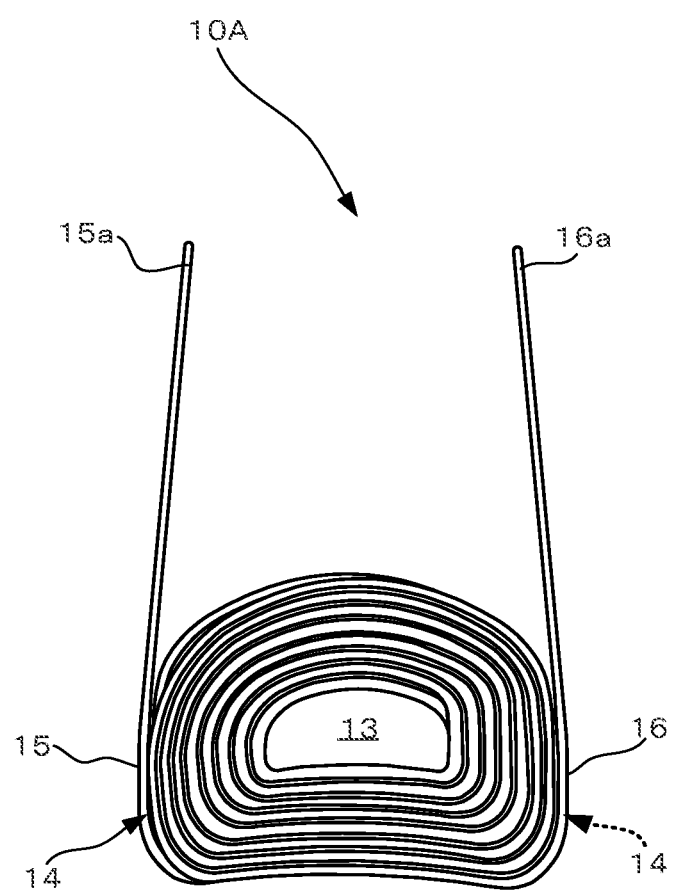

FIG. 5 is an explanatory diagram in which each α-winding coil (single unit) 10 is bent into a curved shape towards one side-surface side thereof at the same curvature so as to be connected in an annular shape. For example, when the plurality of α-winding coils 10 is a total of three α-winding coils (assuming a three-phase alternating-current motor), the α-winding coils 10 are connected into a cylindrical shape in a manner similar to that of the coreless coil (the series of air-core α-windings) 1 shown in FIG. 1.

Figure 6:
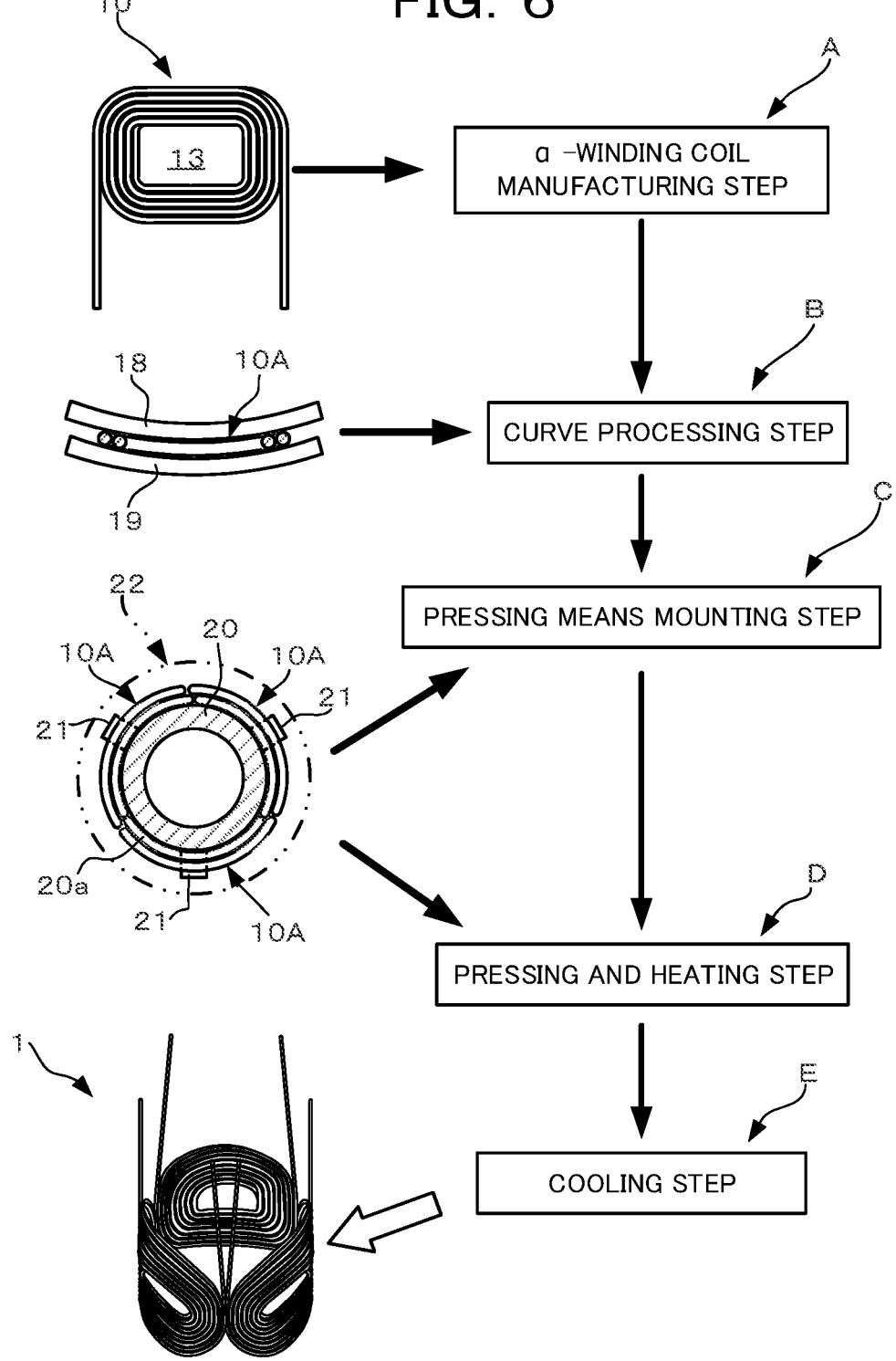

Here, an example of a method for manufacturing the coreless coil 1 will be described with reference to FIG. 6. The method for manufacturing the coreless coil 1 is characterized in that, the center opening 13 of each single-unit α-winding coil 10 that is curved to one inner surface side is fitted onto each of a plurality of reference support protrusion pieces 21 that are provided at a predetermined interval in a circumferential direction of an outer peripheral surface of the core body 20. The plurality of single-unit α-windings coils 10 that are attached to the core body 20 in an annular shape by the reference support protrusion pieces 21 are simultaneously pressed in a radially inward direction by a pressing tool 22 that is arranged in relation to the outer peripheral surface of the core body 20. While the state of pressure is maintained, the heating means heats the plurality of single-unit α-winding coils 10. As a result, the annular coreless coil 1 is obtained by the connection stepped portions 14 and 14 of the plurality of single-unit α-winding coils 10 overlapping each other and being fused.

First, A is a step of manufacturing a plurality of single-unit α-winding coils 10. Here, "plurality" refers to at least three or more when, for example, a single three-phase alternating-current motor is assumed. The α-winding coil 10 is manufactured through use of a winding machine that has a bobbin-shaped winding body (not shown). The body of the α-winding coil 10 is wound around the bobbin-shaped winding body a required number of times, and the α-winding coil 10 is thereby completed. Upon completion, the winding body separates from the α-winding coil 10.

Next, B is a curve processing step. In the curve processing step B, an inner tool 18 of which an outer peripheral surface has the same curvature and an outer tool 19 of which an inner peripheral surface thereof corresponds to the curvature are used. The curve processing is preferably performed while the α-winding coil 10 is held such as to be sandwiched between the inner tool 18 and the outer tool 19.

Next, C is a step of mounting the curved α-winding coil 10 acquired at the curve processing step B to the pressing means. In the pressing means mounting step C, for example, a total of three α-winding coils 10A are attached to an outer peripheral surface 20a of the pipe-shaped, tube-shaped, or rod-shaped core body 20. The method for attachment to the outer peripheral surface 20a of the core body 20 varies. However, for example, with a total of three protrusion pieces that are urged in an outward direction at all times by an elastic element (not shown) serving as the reference support protrusion pieces 21, the three reference support protrusion pieces 21 are arranged on the same horizontal plane on the outer peripheral surface 20a of the core body 20 such that such that center positions thereof are spaced at a substantially 120-degree interval. Because the reference support protrusion pieces 21 are positioned on the same horizontal plane, the connection stepped portions 14 and 14 of the total of three α-winding coils 10A of which the center openings 13 and 13 are supported by the reference support protrusion pieces 21 are arranged such as to abut each other Then, the pressing tool (indicated by a virtual line for convenience) 22 that is arranged in relation to the outer peripheral surface 20a of the core body 20 directly or indirectly presses the total of three α-winding coils 10A in the radially inward direction of the core body 20.

Next, D is a pressing and heating step at which the plurality of α-winding coils 10A are continuously self-fused to each other and formed into an annular shape using the heating means such as electrical resistance heat, hot air, or infrared irradiation. In the pressing and heating step D, for example, when heat of 80 degrees Celsius to 200 degrees Celsius is applied to the pressing means 20 and 21 used in the pressing means mounting step C, as shown in FIG. 4, the gap portions of the connection stepped portions 14 and 14 of the α-winding coils 10A decrease. As a result of so-called self-fusion, the outer peripheral portion 15 of the first coil layer 11 and the outer peripheral portion 16 of the second coil layer 12 that are alternately overlapping are bonded in close contact.

In the pressing and heating step D, when the pressing tool 22 is moved in a radially outward direction and, for example, an operating rod that is fitted into the pipe-shaped core body 20 is made to slide, the three reference support protrusion pieces 21 simultaneously withdraw into the pipe-shaped core body 20 against the elastic force of the elastic element (at this time, the elastic element contracts) and as a result, the coreless coil (the series of air-core α-windings) 1 separates from the core body 20. When the coreless coil (the series of air-core α-windings) 1 is separated from the core body 20, there are a method in which the three reference support protrusion pieces 21 simultaneously withdrawn into the core body 20 as a result of elastic return force of the elastic element (not shown) (at this time, the elastic element expands) when a nail-shaped insertion pin (not shown) is pulled out of a center hole of the core body 21, a method in which the three reference support protrusion pieces 21 and the core body 20 are independent and separate members and the reference support protrusion pieces 21 are removed from the core body 20, and the like. The coreless coil (the series of air-core α-windings) 1 is preferably prevented from becoming deformed regardless of which method among the method in which the elastic element is contracted, the method in which the elastic element is expanded, the method in which the reference support protrusion pieces 21 are pulled out, and the method in which the reference support protrusion pieces 21 are pushed in is used.

Finally, E is a step of cooling the coreless coil (the series of air-core α-windings) 1 using a cooling means. In the cooling step E, for example, the coreless coils (the series of air-core α-windings) 1 are arrayed on a shelf and cold air is blown on the coreless coils (the series of air-core α-windings) 1.

In the above-described configuration, the core body 20 that has the plurality of reference support protrusion pieces 12 is used. Therefore, advantages in that the point-symmetrical connection stepped portions 14 and 14 of the single-unit α-winding coils 10A are reliably connected to each other, efficiency of the manufacturing operation is improved, and the like are achieved.

Examples

In the coreless coil (the series of air-core α-windings) 1 according to the first embodiment, a coil body (composed of the conductive wire, the insulating coating, and the fused coating) may be a so-called rectangular wire or a round wire. In addition, because the first embodiment is an example for describing the present invention, the number of windings of the coil, dimensions, thickness, and configuration ratios are not interpreted such as to be limited to the drawings. Therefore, descriptions of known matters and detailed matters are omitted. The present invention may be modified in design as appropriate without departing from the object.

Figure 7:
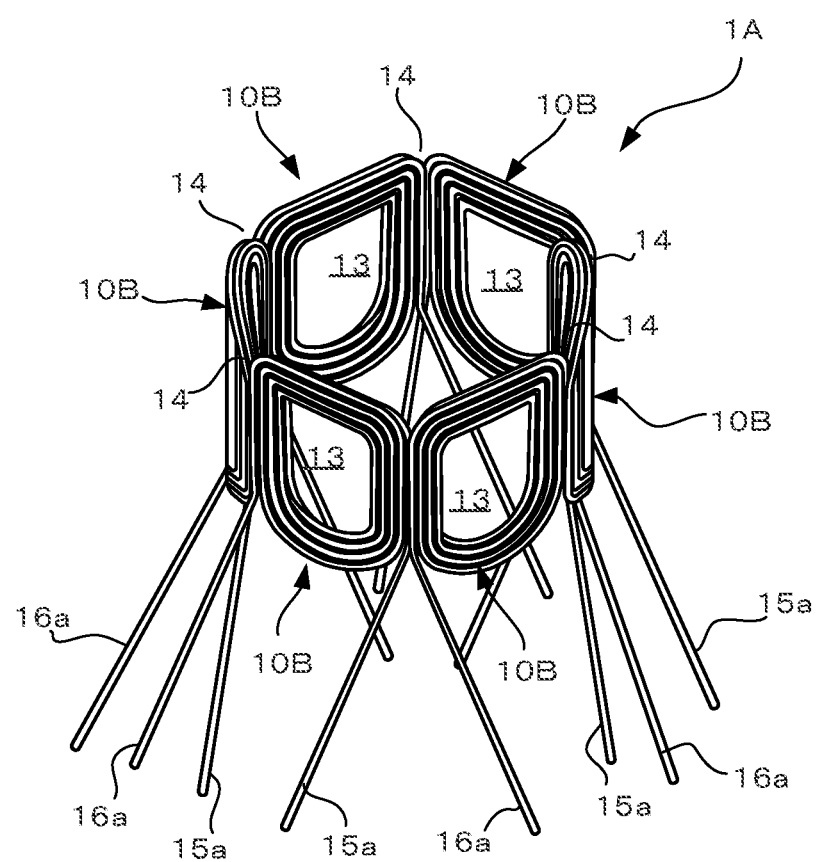
FIG. 7 is an explanatory diagram according to a second embodiment of the present invention.

A second embodiment is shown in FIG. 7 for emphasis. A coreless coil (the series of air-core α-windings) 1A according to the second embodiment is that which indicates that a single-unit α-winding coil 10B may have a substantially rectangular annular shape (such as an oblong annular shape), the point-symmetric connection stepped portions 14 and 14 of the α-winding coils 10B may be opposing end portions in a short-diameter direction, and a total of six α-winding coils 10B may be provided.

Figure 8:
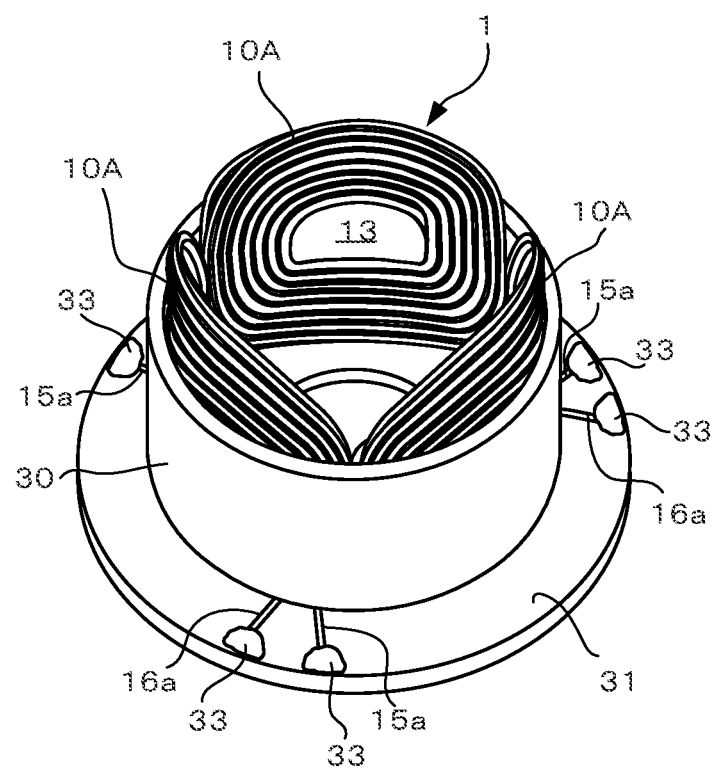
FIG. 8 is an explanatory diagram according to a third embodiment of the present invention.

FIG. 8 is an explanatory diagram according to a third embodiment of the present invention. According to the third embodiment, a cylindrical metal core 30 is integrally fitted onto or into the coreless coil (the series of air-core α-windings) 1 shown in FIG. 1. In addition, a flange-shaped printed board 31 is provided in one end portion of the cylindrical core 30. Of course, as another embodiment, only the "cylindrical core 30" may be added to the coreless coil (the series of air-core α-windings) 1, and the printed board 31 may not be provided.

According to the third embodiment, the configuration that is the printed board 31 is further limited. Therefore, when the third embodiment is carried out, the pair of protruding end portions 15a and 16a of each of the plurality of α-winding coils is preferably soldered 33 to the printed board 31.

INDUSTRIAL APPLICABILITY

The present invention is used in compact electric motors, power generators, induction heating (IH) heater coils, and the like.

What is claimed is:
1. A coreless coil comprising:
a plurality of α-winding coils each in a form of an electrically conductive wire wound into a first and a second layer of windings, each of the layers having a same shape, a same width and a center opening, the first and second layers of each of the α-winding coils being laminated together and thereby connected;
wherein each outer peripheral portion of each of the α-winding coils in a direction of connection of the plurality of α-winding coils to one another has a connection stepped portion, each of the connection stepped portions comprising a respective end portion of the wire in a respective one of the layers which end portion is connected to the other layer by the lamination and thereby constitutes a connected end portion of the α-winding coil, and from each of the connected end portions extends a respective end portion of the wire which end portion is an end portion of the α-winding coil not laminated and thus not connected to the other layer and thereby constituting an unconnected end portion of the α-winding coil, the connection stepped portion of each of the α coils are point-symmetric in relation to a Z axis of the center openings of the first and second layers,
wherein the Z-axis is an axis that, in relation to an X-axis that is a center of both connected end portions of the α-winding coil and extends along a lamination boundary of the first and second layers, is a center of both unconnected end portions of the α-winding coil and passes through the lamination boundary so as to be orthogonal to the X-axis, and the plurality of α-winding coils are connected in an annular shape in a state in which the connection stepped portions overlap each other and are attached to each other.

2. The coreless coil according to claim 1, wherein:
the annular shape is a hollow circular cylinder, and a hollow cylindrical body is fitted to an inner or outer cylindrical peripheral surface of the circular hollow cylindrical shape of the plurality of connected α-windings coils.

3. The coreless coil according to claim 2, wherein:
a flange-shaped printed board is provided in one end portion of the hollow cylindrical body, and the unconnected end portions of each of the α-windings protrudes from the α-winding coils and is soldered to the printed board.

4. A method for manufacturing a coreless coil comprising:
providing a plurality of α-winding coils each in a form of an electrically conductive wire wound into a first and a second layer of windings, each of the layers having a same shape, a same width and a center opening, the first and second layers of each of the α-winding coils being laminated together and thereby connected, wherein each outer peripheral portion of each of the α-winding coils in a direction of connection of the plurality of α-winding coils to one another has a connection stepped portion, each of the connection stepped portions comprising a respective end portion of the wire in a respective one of the layers which end portion is connected to the other layer by the lamination and thereby constitutes a connected end portion of the α-winding coil, and from each of the connected end portions extends a respective end portion of the wire which end portion is an end portion of the α-winding coil not laminated and thus not connected to the other layer and thereby constituting an unconnected end portion of the α-winding coil, the connection stepped portions of each of the α-coils are point-symmetric in relation to a Z-axis of the center openings of the first and second layers, wherein the Z-axis is an axis that, in relation to an X-axis that is a center of both connected end portions of the α-winding coil and extends along a lamination boundary of the first and second layers, is a center of both unconnected end portions of the α-winding coil and passes through the lamination boundary so as to be orthogonal to the X-axis;
curving each of the plurality of α-winding coils about an axis parallel to a plane of the opening of the α-winding coil;
fitting the center opening of each of the plurality of curved α-winding coils onto a respective one of a corresponding plurality of reference support protrusion pieces that are provided in a circumferential direction on an outer peripheral surface of a cylindrical core body at a predetermined interval, a curved face of each of the α-winding coils facing the cylindrical core body with an axis of curvature of the α-winding coil parallel to the axis of the cylindrical core body, the plurality of α-winding coils thereby being attached to the core body in an annular array;

simultaneously pressing in a radially inward direction the plurality of α-winding coils attached to the core body in an annular array by the reference support protrusion pieces thereby to overlap the connection stepped portions of the α-winding coils which are mutually adjacent; and while maintaining the pressing state, heating the plurality of α-winding coils to fuse together the plurality of α-winding coils at the overlapping connection portions thereof to obtain an annular coreless coil.

\* \* \* \* \*